May 11, 1954 — H. HEYDENRYK — 2,677,909
ILLUMINATED PICTURE FRAME
Filed Nov. 1, 1951 — 2 Sheets-Sheet 1

INVENTOR
HENRY HEYDENRYK
BY Herman L. Gordon
ATTORNEY

May 11, 1954

H. HEYDENRYK 2,677,909

ILLUMINATED PICTURE FRAME

Filed Nov. 1, 1951

INVENTOR
HENRY HEYDENRYK
BY Herman L. Gordon
ATTORNEY

Patented May 11, 1954

2,677,909

UNITED STATES PATENT OFFICE 2,677,909

ILLUMINATED PICTURE FRAME

Henry Heydenryk, Rye, N. Y.

Application November 1, 1951, Serial No. 254,311

2 Claims. (Cl. 40—152.2)

This invention relates to picture frames, and more particularly to an improved illuminated picture frame.

A main object of the invention is to provide an improved illuminated picture frame which is simple in construction, which provides uniform distribution of the light on the picture contained therein, and which illuminates the picture alone and substantially prevents direct light from reaching the frame.

A further object of the invention is to provide an improved illuminated picture frame which involves only a few parts, which is easy to assemble, which is arranged so that the light sources thereof are completely shielded from direct view from the sides or front of the frame, and which provides efficient and uniform illumination of the surface of the picture contained in the frame.

A still further object of the invention is to provide an improved illuminated picture frame of the type employing concealed tubular lamps along the margins of the frame to provide illumination of the picture contained in the frame, the frame being arranged so that the lamps are concealed from direct view from all angles around the frame but allowing the lamps to evenly illuminate all portions of the picture therein, said frame being further arranged so that the lamps may be readily replaced when necessary.

A still further object of the invention is to provide an improved illuminated picture frame of relatively small bulk which employs lamps of the tubular type which are concealed in the frame and which are supported independently of the outer portion of the frame, the lamps and supporting means for the lamps being readily removable as a unit from the outer portion of the frame, allowing ready access to the lamps for the replacement thereof when necessary, and allowing outer frame portions of different design to be employed interchangeably with a given picture without requiring rebuilding of the entire frame or revision of its illuminating means.

A still further object of the invention is to provide an improved base structure for a picture frame, said base structure being adapted to be employed interchangeably with different outer frame portions in accordance with different decorating schemes of the room or gallery in which a picture is to be hung, said base structure including illuminating means for the picture and being arranged to cooperate with its outer frame portion to effectively conceal the illuminating means from direct view from any angle, said base structure being further arranged to provide efficient ventilation for the frame so that heat from the illuminationg means will not injure the picture or any part of the frame.

Further objects and advantages of the invention will become apparent from the following description and claims, and from the accompanying drawings, wherein:

Figure 1:
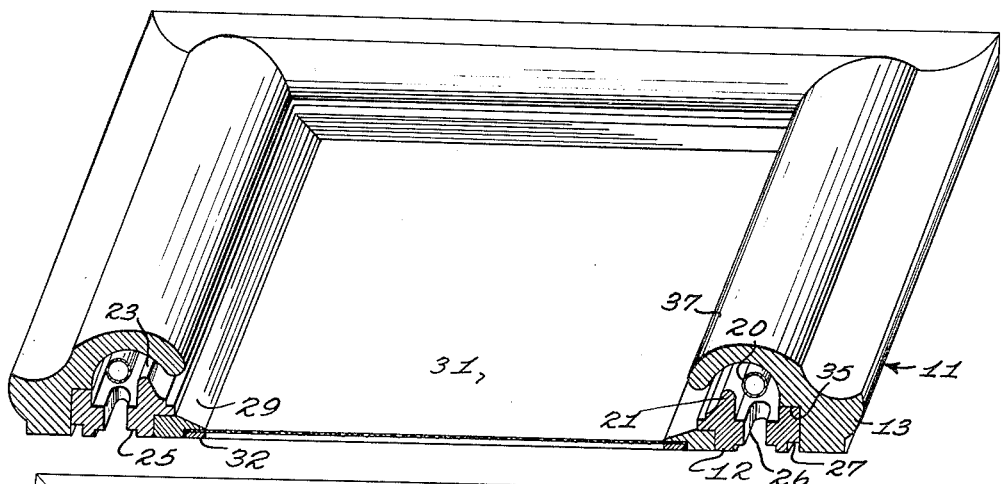
Figure 1 is a sectional perspective view of an assembly employing an improved illuminated frame constructed in accordance with the present invention.

Referring to the drawings, a complete picture frame assembly according to the present invention is designated generally at 11. The assembly comprises a rectangular base section 12 and a detachable outer frame section 13 fitting over and receiving said base section. Base section 12 comprises a rectangular frame defined by the respective side elements 14, 15, 16 and 17, as shown. The front side of said base section is formed with a continuous groove or channel 18 in which are secured the respective opposing pairs of sockets 19, 19 in which are mounted the respective tubular fluorescent lamps 20, a lamp 20 being mounted on each side element of the base section 12 and the lamps lying in a common plane parallel to the plane of the base section.

Figure 4:
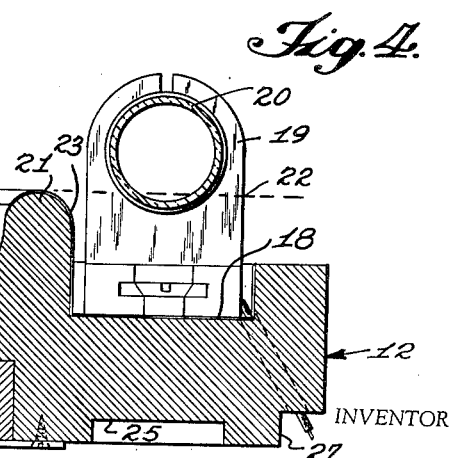
Figure 4 is an enlarged cross-sectional detail view taken on line 4—4 of Figure 3.
Figure 7:
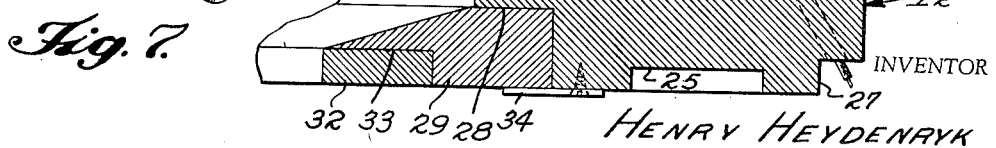
Figure 7 is an enlarged perspective view of one of the picture frame fastening clips employed in the assembly of Figures 1 and 2.

Base section 12 is formed inwardly of the lamps 20 with an upstanding marginal rib 21 extending continuously around the base section and rising at least substantially to the plane of the bottom surfaces of the lamps, and preferably rising above said lamp bottom surface plane, as shown in Figure 4 by the dotted line 22. A reflective coating 23 of aluminum foil or the like is secured to the top surface of the base section, in the groove 18 and around the surface of the rib 21, as shown, said reflective coating terminating at 24 on the side of rib 21 opposite the lamps 20.

The bottom of the base section 12 is formed with the continuous groove 25, and the respective side elements of the base section are formed with spaced ventilating slots 26 establishing communication between the back groove 25 and the front groove 18, said slots, of course, extending through the reflective coating 23.

The back margin of the base section is formed with a recess 27 extending continuously around the base section, for housing the wiring connected to the lamp sockets.

Figure 2:
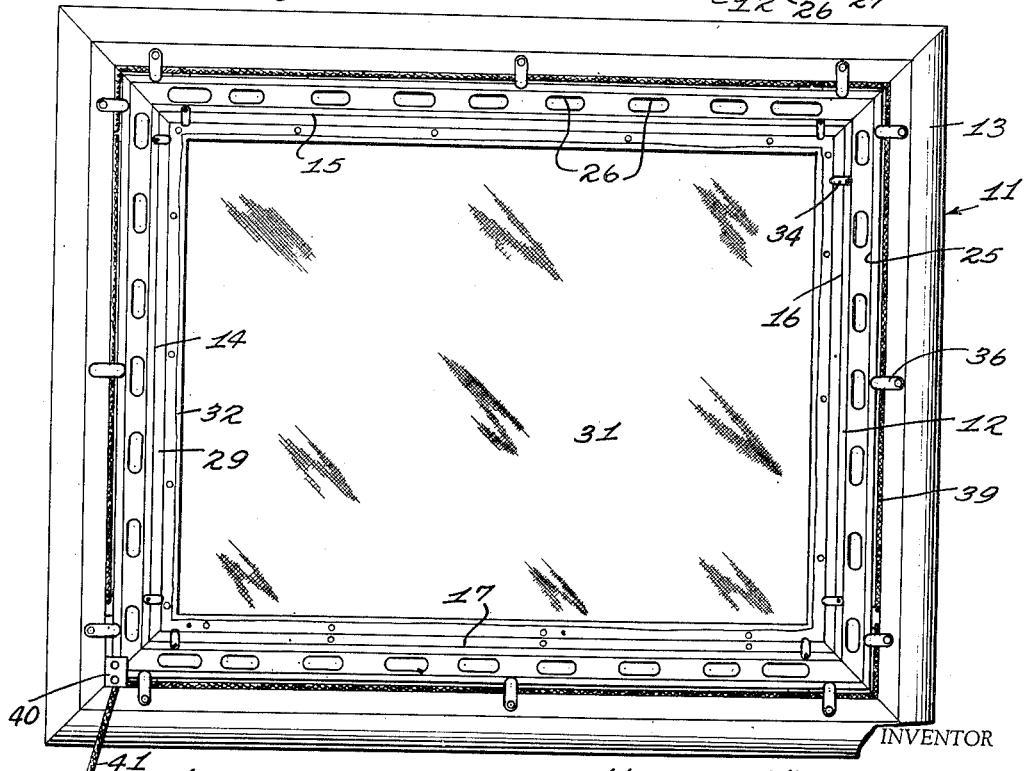
Figure 2 is a back elevational view of the picture frame assembly of Figure 1.
Figure 3:
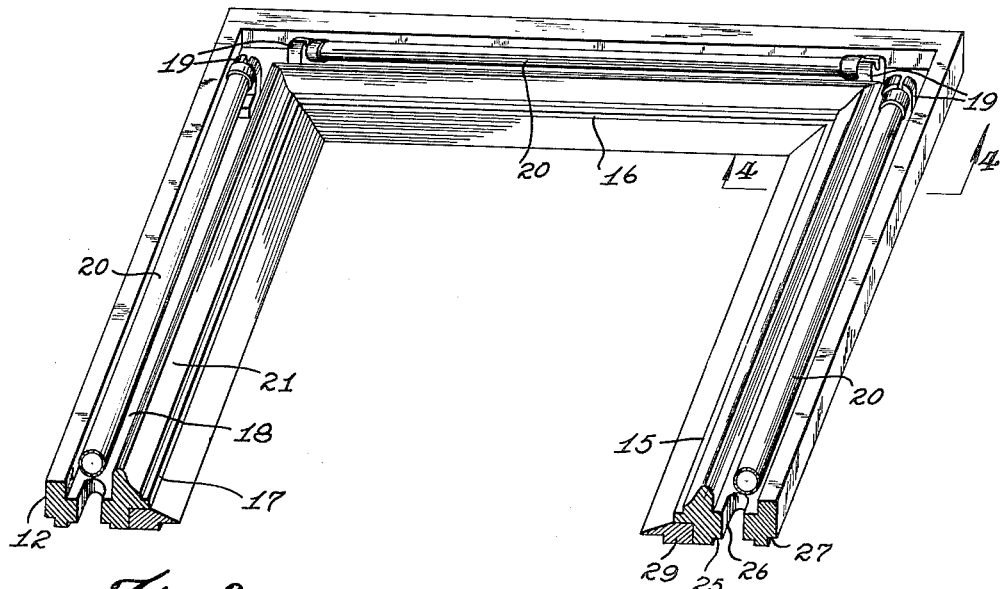
Figure 3 is a sectional perspective view of the picture frame base structure of the assembly of Figures 1 and 2.
Figure 6:
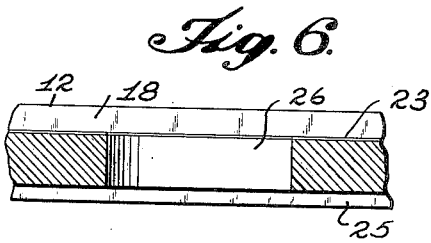
Figure 6 is an enlarged cross-sectional detail view taken on line 6—6 of Figure 5.

The back inner corner of the base section 12 is formed with a recess 28 extending continuously around the base section. Designated at 29 is a rectangular insert frame which is received in the recess 28. The painting 31 to be mounted in the frame assembly is secured on a rectangular frame 32, which is secured in any suitable manner in a recess 33 of the insert frame 29. The insert frame 29 is detachably secured in the recess 28 by clips 34 pivotally secured to the back of base section 12, as shown in Figures 2 and 4. Insert frame 29 is preferably made of material having low heat conductivity, whereby transmission of heat to the painting 31 is minimized. If so desired, the insert frame 29 may be permanently secured to the base section by the use of nails or the like, instead of employing the pivoted clips 34.

Figure 5:
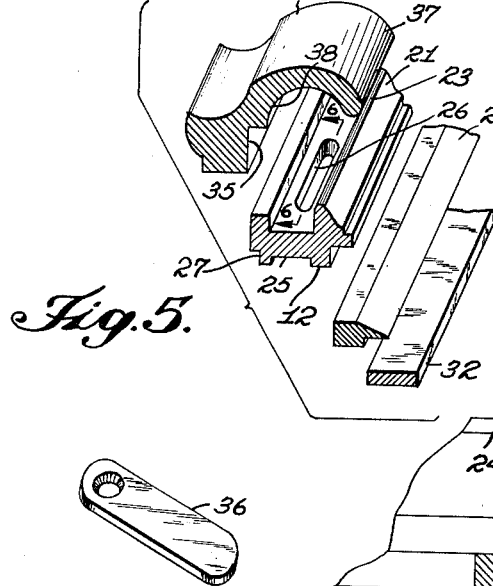
Figure 5 is an enlarged fragmentary sectional perspective view showing the elements of the picture frame assembly of Figures 1 and 2 in separated positions.

The outer frame section 13 is formed with a recess 35 receiving the outer marginal portion of the base section 12, as shown in Figures 1 and 5. Pivotally secured to the back of the outer frame section are a plurality of clips 36 which may be swung into clamping engagement with the back of base section 12 so as to rigidly secure the outer frame section to said base section in overlying relationship thereto. The outer frame section is formed with an overhanging, inwardly extending flange 37 which extends over and terminates inwardly of the rib 21, as shown in Figure 1. The flange 37 preferably depends substantially to the top plane 22 of the rib 21. The interior surface of the outer frame section 13 is coated with reflective material 38, such as aluminum foil, or the like.

The exterior surface of the outer frame section may be suitably decorated or carved. When it is desired to change the outer frame section, as when the decorating scheme of the room or gallery in which the painting is hung is changed, it is merely necessary to unclamp the securing clips 36 thereof from the base section, allowing the outer frame section to be detached from the base section without disturbing the painting 31, and allowing a new outer frame section to be mounted on the base section.

It will be noted from Figure 1 that the depending flange 37 is inwardly spaced from the rib 21 by a relatively small amount, sufficient to allow only a very limited amount of direct light from lamps 20 to reach the painting 31 and a relatively large amount of reflected light to reach the painting from the reflecting surface 38. It will be further apparent that, due to the overhang of the flange 37 and the height of the rib 21, the light path between said flange and rib will be directed downwardly and inwardly toward the surface of the painting, and that light from the respective lamps 20 will be prevented from reaching the opposite side elements of the frame assembly. Direct vision of the lamps 20 from any angle outside the frame is prevented by the light baffle elements 37 and 21. At the same time, even distribution of the light over the surface of the painting is provided by the reflected light from the respective reflecting surfaces 23 and 38. Said reflecting surfaces also prevent absorption of radiant heat by the frame sections 12 and 13 and thereby limit heating of said frame sections. Heating of said frame sections is further limited by the provision of the ventilating groove 25 and slots 26, allowing free circulation of air longitudinally in the side elements of the frame assembly.

Due to the close spacing of the light baffle elements 37 and 21, it is obviously very difficult to reach the lamps 20 when the frame is completely assembled, and, since the spacing between the elements 37 and 21 may be less than the diameter of the lamps 20, it may be normally impossible to remove the lamps through the space between said elements. However, when it is desired to obtain access to the lamps, as for cleaning or replacement thereof, it is merely necessary to rotate the clips 36 to unclamping positions, allowing the outer frame section 13 to be detached from the base section 12, and providing complete access to the lamps 20. This also provides free access to the reflectors 38 and 23 for cleaning or renewal thereof.

The wiring, shown at 39, connecting the sockets 19 to the power source, are housed in the recess 27, as above explained.

If so desired, a suitable control switch 40 may be mounted in the base section 12, connected in series between the energizing circuit of the lamps 20 and the line cord 41 employed to connect the base section to the source of electric power, as shown in Figure 2.

While a specific embodiment of an improved illuminated picture frame assembly has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a picture frame, an open polygonal base section, said base section being formed with a continuous top channel extending therearound and defining an outer peripheral rib and an inner peripheral rib, respective tubular lamps mounted in said top channel and disposed on the respective sides of said base section, said inner rib projecting upwardly to at least the bottom plane of said lamps, an outer frame section detachably secured on said outer rib, and an overhanging, inwardly projecting flange on said outer frame section extending continuously around the outer frame section and extending over and terminating inwardly of said inner rib, said flange depending downwardly substantially to the top plane of said inner rib and being spaced inwardly from said inner rib to define a passage for light between said flange and said inner rib, said inner rib being cooperatively arranged with respect to said flange to prevent direct view of the lamps from the front of the picture frame, the back of said base section being formed with a continuous bottom ventilating channel extending completely around the frame, said bottom channel being substantially coextensive with said first-named channel and of substantial cross-sectional area, the wall between said top channel and said last-named channel being formed with a plurality of apertures disposed below and substantially in alignment with said lamps, whereby air may circulate freely around the frame through said top and bottom channels and through said apertures to cool the lamps.

2. In a picture frame, an open polygonal base section, said base section being formed with a continuous top channel extending therearound and defining an outer peripheral rib and an inner peripheral rib, respective tubular lamps mounted in said top channel and disposed on the respective sides of said base section, said inner rib projecting upwardly to at least the bottom plane of said lamps, an outer frame section detachably secured on said outer rib, and an overhanging, inwardly projecting flange on said outer frame section extending continuously around the outer frame section and extending over and terminating inwardly of said inner rib, said flange depending downwardly substantially to the top plane of said inner rib and being spaced inwardly from said inner rib to define a passage for light between said flange and said inner rib, said inner rib being cooperatively arranged with respect to said flange to prevent direct view of the lamps from the front of the picture frame, the back of said base section being formed with a continuous bottom ventilating channel extending completely around the frame, said bottom channel being substantially coextensive with said first-named channel and of substantial cross-sectional area, the wall between said top channel and said last-named channel being formed with a plurality of regularly spaced slots of substantial length and width disposed below and being substantially parallel to said lamps, whereby air may circulate freely around the frame through said top and bottom channels and through said slots to cool the lamps.

References Cited in the file of this patent

UNITED STATES PATENTS

| Number | Name | Date |
|---|---|---|
| 481,117 | Naegele | Aug. 16, 1892 |
| 947,127 | Roberts | Jan. 18, 1910 |
| 2,170,377 | Nisle | Aug. 22, 1939 |
| 2,489,477 | Brecher | Nov. 29, 1949 |
| 2,529,713 | Thurston | Nov. 14, 1950 |
| 2,550,954 | Benedict | May 1, 1951 |

FOREIGN PATENTS

| Number | Country | Date |
|---|---|---|
| 411,731 | France | June 24, 1910 |
| 723,455 | France | Apr. 9, 1932 |